United States Patent [19]

Tajima et al.

[11] Patent Number: 5,709,761

[45] Date of Patent: Jan. 20, 1998

[54] RUBBER SHEET JOINING METHOD AND RUBBER SHEET JOINING DEVICE

[75] Inventors: Yoshitaka Tajima; Shigenori Noguchi, both of Kobe, Japan

[73] Assignee: Bando Chemical Industries, Ltd., Kobe, Japan

[21] Appl. No.: 337,534

[22] Filed: Nov. 9, 1994

[30] Foreign Application Priority Data

Nov. 25, 1993 [JP] Japan .................................. 5-294875

[51] Int. Cl.⁶ .................................................. B65H 21/00
[52] U.S. Cl. .......................... 156/159; 156/251; 156/361; 156/502; 156/507; 156/515; 83/471.1; 83/471.2; 83/477.2; 83/614; 83/622; 242/553; 242/554.1; 242/556
[58] Field of Search ........................... 156/157, 159, 156/502, 507, 515, 251, 353, 361; 242/553, 554.1, 554.2, 555.2, 556; 83/16, 471.1, 471.2, 483, 614, 618, 622, 951, 471

[56] References Cited

U.S. PATENT DOCUMENTS

| | | | |
|---|---|---|---|
| 2,117,452 | 5/1938 | Robinson et al. | 156/515 |
| 3,384,527 | 5/1968 | Fener | 156/515 X |
| 3,390,038 | 6/1968 | Hadley | 156/159 |
| 3,556,912 | 1/1971 | Burgo et al. | 156/507 X |
| 3,623,932 | 11/1971 | Woodhall | 156/507 X |
| 3,796,625 | 3/1974 | Rutledge | 156/502 |
| 3,859,152 | 1/1975 | Brey et al. | 156/515 X |
| 5,045,134 | 9/1991 | Schenker et al. | 156/502 X |
| 5,240,534 | 8/1993 | Tokita et al. | 156/502 X |

FOREIGN PATENT DOCUMENTS 2178152  7/1990  Japan .

*Primary Examiner*—Mark A. Osele
*Attorney, Agent, or Firm*—Sixbey Friedman Leedom & Ferguson; Gerald J. Ferguson, Jr.; Thomas W. Cole

[57] ABSTRACT

A method and a device for joining rubber sheets. A pressing disk having a shape that a cutting disk is cut at an edge thereof by about 0.7 mm to 1.0 mm joins with pressure edge parts of unvulcanized rubber sheets which are stackably aligned with one another and clamped. The cutting disk cuts the joined edge parts of the rubber sheets. Another pressing disk having a shape that the edge of the cutting disk is cut by about 0.7 mm to 1.0 mm is moved on the cut edge parts along the cutting line in the same manner as the cutting disk, thereby securely joining the joined parts by pressing them again.

19 Claims, 4 Drawing Sheets

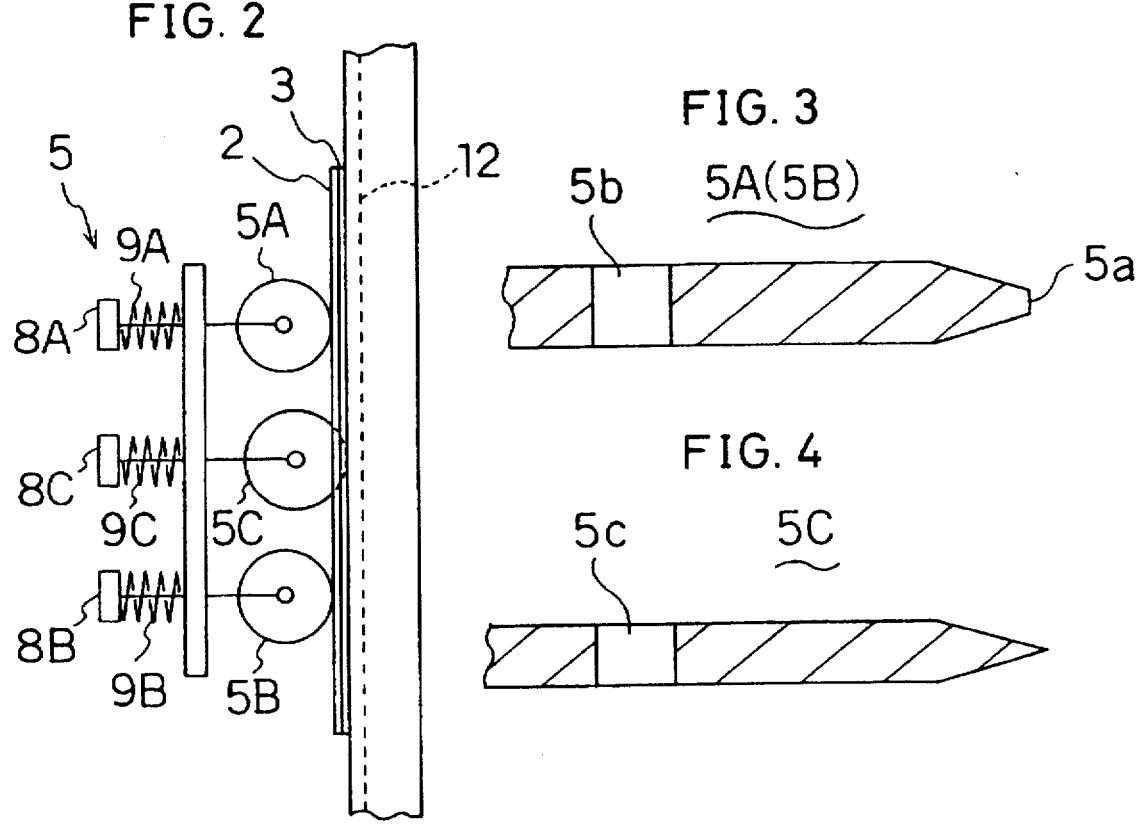

RUBBER SHEET JOINING METHOD AND RUBBER SHEET JOINING DEVICE

BACKGROUND OF THE INVENTION

This invention relates to a rubber sheet joining method for joining unvulcanized rubber sheets with a thickness of 0.6 mm to 0.7 mm to be mainly used for a transmission belt and relates to a rubber sheet joining device for joining the above rubber sheets.

A known rubber sheet joining device is disclosed in Japanese Patent Application Laid Open No. 2-178152. This rubber sheet joining device comprises a cutter means for cutting stacked unvulcanized rubber sheets, means for removing remaining pieces left by the cutting of the unvulcanized rubber sheets, and means for taking up the cut rubber sheets and joining the cut edges of the rubber sheets with each other.

Such a rubber sheet joining device works by the principle that when two stacked rubber sheets are cut by the cutter means, the rubber sheets are joined together by the pressing force at the site of cutting and the inherent adhesion of the rubber forming the sheets.

In an actual joining of rubber sheets by such a joining device, the rubber sheets are cut with impact on a blade receiving plate by moving a blade of the cutter means by an air cylinder. Accordingly, the blade of the cutter means is worn away so that the cutter life is shortened, thereby increasing the frequency of blade replacements. Further, when the blade of the cutter means is worn off, the resulting metallic particles are attached to the joined rubber sheets and mixed into the belt product, thereby resulting in a defective belt. Furthermore, as a result of the lack of strength at the joined portion of the sheets, the joined sheets often become separated from the joined part at the time the belt is formed. At this time, a series of sheets must be continuously joined if the belt forming operation is to be efficient. If the joined part is disjoined or ripped due to tension applied to the sheets at the time the belt is formed, belt forming productivity is significantly impaired.

SUMMARY OF THE INVENTION

This invention has its object of providing a method and a device for joining rubber sheets, whereby a long life of a cutter means is obtained and rubber sheets can be joined at a high strength.

The invention pertains to a rubber sheet joining method for joining edge parts of first and second unvulcanized rubber sheets wherein the rubber sheets are stacked and cut and joined. This method includes a first step of aligning edges of the first and second unvulcanized rubber sheets with each other in a position where the rubber sheets are stackable and then clamping the edge parts of the rubber sheets thereby stacking them, a second step of pressing the clamped edge parts of the rubber sheets by a pressing disk that has a peripheral pressing face and is rotably supported, and a third step of cutting the edge parts of the rubber sheets by a cutting disk having a sharp edge and which is rotably supported. In this method, edge parts of both the rubber sheets are joined by pressure applied by the pressing disk that has the peripheral pressing face. The joined parts of both the rubber sheets are then cut by the cutting disk. Since the clamped sheet edge parts are first pressed by the pressing disk and then are cut by the cutting disk having the sharp edge which is rotatably supported, the life of the cutting disk can be increased and the rubber sheets can be joined at a sufficient joining strength. Preferably, the edge of the pressing disk is radially truncated by about 0.7 mm to 1.0 mm relative to the cutting disk to form the peripheral pressing face. The width of the parts joined with pressure is determined by the width of the flat peripheral pressing face of the pressing disk.

After the third step, there may be added a fourth step of pressing again the clamped edge parts of the rubber sheets by a second pressing disk having a peripheral pressing face which is rotatably supported. That is, after the rubber sheets are cut by the cutting disk in the third step, the above second pressing disk having the peripheral pressing face is moved on the cut edges of both the rubber sheets along a cutting line in the same way as the cutting disk so that the joined parts are pressed again, thereby increasing joining strength. The second pressing disk also preferably has an edge that is radially truncated compared to the edge of the cutting disk by about 0.7 mm to 1.0 mm to form the peripheral pressing face. In this case, the first and second pressing disks and the cutting disk are arranged in a line.

This invention also pertains to a rubber sheet joining device for joining edge parts of first and second unvulcanized rubber sheets so as to cut stacked rubber sheets and to join the cut edge parts thereof. This device comprises aligning means for aligning edges of the first and second unvulcanized rubber sheets with each other in a position where the rubber sheets are stackable, clamping means for clamping the sheet edge parts aligned by the aligning means thereby stacking them, and cutting and joining means comprising a pressing disk having a peripheral pressing face which is rotatably supported, and a cutting disk having a sharp edge which is also rotatably supported for pressing and cutting the sheet edge parts clamped by the clamping means. According to this rubber sheet joining device, edge parts of both the rubber sheets aligned with each other by the aligning means are clamped by the clamping means. The sheet edge parts clamped are joined with pressure by the pressing disk having the peripheral pressing face which is rotatably supported. The sheet edge parts are then cut by the cutting disk having the sharp edge which is rotatably supported. Since the pressing disk and the cutting disk function to join the rubber sheets with pressure and to cut the rubber sheets, respectively, the life of the cutting disk can be increased and the rubber sheets can be joined at a sufficient joining strength.

In this case, the cutting and joining means may be configured so that the cutting disk having the rotatably supported sharp edge is interposed between first and second pressing disks, each having a rotatably supported peripheral pressing face. Under such a construction, the joined edge parts of the rubber sheets are cut by the cutting disk and then pressed again by the second pressing disk so that the edge parts of both the rubber sheets are repeatedly joined with pressure. This advantageously increases the joining strength. Each of the pressing disks preferably has a shape like the cutting disk whose edge has been truncated by about 0.7 mm to 1.0 mm to form the peripheral pressing faces.

The aligning means may be composed of first and second transfer means for transferring the first and second unvulcanized rubber sheets at a set speed, timer means for measuring a set period of time, a photoelectric switch for sensing the edge parts of the first and second unvulcanized rubber sheets, and control means connected to the timer means and the photoelectric switch for controlling the first and second transfer means according to signals from the timer means and the photoelectric switch in order that the edge parts of the first and second unvulcanized rubber sheets are aligned with each other. Under such a construction, according to a signal from the timer means for measuring a set period of time and signals from the photoelectric switch for sensing the edge parts of the first and second unvulcanized rubber sheets, the control means controls the first and second transfer means at a set speed respectively so that the sheet edge parts are aligned with each other. Thus, the edge parts of the unvulcanized rubber sheets can be aligned with each other by a simple construction.

Further, the clamping means may include a base table fixed at a set position, a clamping member opposed to the base table and clamping member driving means connected to the clamping member for adjusting a distance between the clamping member and the base table. Under such a construction of the clamping means, the clamping member driving means adjusts the distance between the clamping member and the base table. Accordingly, the clamping on the rubber sheets can be readily carried out and released.

This invention also pertains to a rubber sheet joining method for joining edge parts of first and second unvulcanized rubber sheets so as to cut the rubber sheets stacked and join cut edge parts thereof. The method comprises a first step of aligning edges of the first and second unvulcanized rubber sheets with each other in a position where the rubber sheets are stackable, and then clamping the edge parts of the rubber sheets thereby stacking them. In the second step, the edge parts clamped at the first step are joined by cutting them with pressure by a cutting disk arranged to cut with an edge having a width of about 0.5 mm that is rotatably supported. Since the sheet edge parts clamped are joined in such a manner as to be cut with pressure by the cutting disk having an edge width of about 0.5 mm, the sheet edge parts can be joined with pressure while they are cut.

Moreover, this invention pertains to a rubber sheet joining device for joining edge parts of first and second unvulcanized rubber sheets so as to cut the rubber sheets stacked and join cut edge parts thereof, wherein the device comprises aligning means for aligning edges of the first and second unvulcanized rubber sheets with each other in a position where the rubber sheets are stackable, clamping means for clamping the sheet edge parts aligned by the aligning means thereby stacking them, and cutting the joining means having a cutting disk having a cutting edge that make a cut of about 0.5 mm in width and rotatably supported for joining the sheet edge parts while cutting them. According to the rubber sheet joining device, edge parts of both the rubber sheets which are aligned with each other by the aligning means are clamped by the clamping means. The sheet edge parts so clamped are joined by pressure cutting with the cutting disk that makes a cut about 0.5 mm in width. Consequently, the sheet edge parts are joined with pressure while they are cut by a simple construction.

BRIEF DESCRIPTION OF THE DRAWINGS

Attached drawings show preferred embodiments of the present invention.

FIG. 2 is a schematic plan view showing a main part of the rubber sheet joining device of FIG. 1.

FIG. 3 is a sectional view showing a shape of a pressing disk.

FIG. 4 is a sectional view showing a shape of a cutting disk.

FIG. 6 is an explanatory diagram showing a joined state of rubber sheets.

FIG. 7 is an explanatory diagram of a disk used for a rubber tension test.

DESCRIPTION OF THE PREFERRED EMBODIMENTS

Detailed description is made below about preferred embodiments of this invention with reference to the attached drawings.

Figure 1:
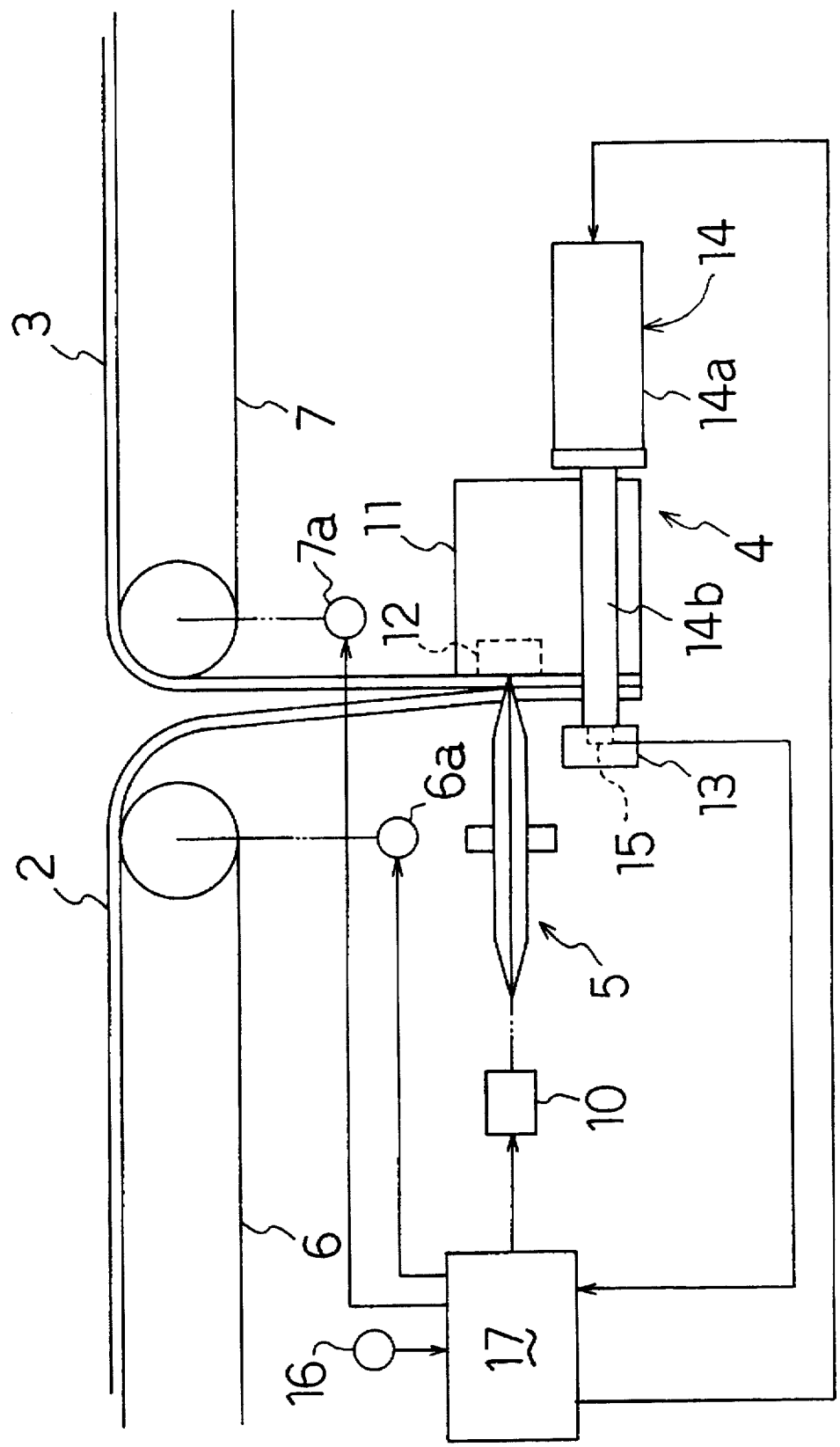
FIG. 1 is a schematic side view showing an embodiment of a rubber sheet joining device.

In FIGS. 1 and 2 each showing a schematic construction of a first embodiment of a rubber sheet joining device of this invention, reference numeral 1 indicates a rubber sheet joining device. The rubber sheet joining device 1 is composed so as to stack edge parts of both first and second unvulcanized rubber sheets 2, 3 in alignment with each other, clamp the edge parts by a clamping means 4, and cut and join the clamped edge parts by a cutting and joining means 5. The first unvulcanized rubber sheet 2 is fed at a set speed by a feeding conveyer 6 (first transfer means) in such a manner that the edge part thereof is dangled from the end of the feeding conveyer 6. The second unvulcanized rubber sheet 3 is taken up at a set speed by driving a take-up conveyer 7 (second transfer means) in a normal direction while dangled from the end of the take-up conveyer 7 by driving the take-up conveyer 7 in a reverse direction.

The cutting and joining means 5 is so composed that a cutting disk 5C is interposed between first and second pressing disks 5A, 5B with the disks 5A, 5B, 5C aligned in a line. The disks 5A, 5B, 5C are each rotatably supported. Each of the pressing disk 5A, 5B has a non-sharp edge, which is formed in such a manner as to be cut shorter by about 0.7 mm to 1.0 mm than the edge of the cutting disk 5C thereby forming a peripheral pressing face 5a (See FIG. 3). The cutting disk 5C has a sharp edge so as to cut the rubber sheet (See FIG. 4). In FIGS. 3 and 4, reference numerals 5b, 5c are central holes for attachment.

The pressing disks 5A, 5B and the cutting disk 5C are provided with supporting members 8A, 8B, 8C for supporting the disks 5A, 5B, 5C and springs 9A, 9B, 9C, respectively, so as to adjust the disk pressure with respect to the below-mentioned disk receiving plate 12. Further, the cutting and joining means 5 is connected to a driving device 10 such as an air cylinder and a motor, so as to move along a line in which the disks 5A, 5B, 5C are arranged.

A disk receiving plate 12 (bearing steel) is fixedly mounted on a base table 11 provided at a fixed position, so as to oppose to the cutting and joining means 5. Below the disk receiving plate 12, a clamping member 13 of a clamping means 4 for clamping the edge parts of both the rubber sheets 2, 3 is provided so as to oppose the base table 11. The clamping member 13 is provided at an end of a piston rod 14b of an air cylinder 14 (clamping member driving means) in which a cylinder body 14a is fixedly mounted at the base table 11, so as to clamp and unclamp the rubber sheets by adjusting a distance between the base table 11 and the clamping member 13 by extending and contracting movements of the air cylinder 14.

The clamping member 13 of the clamping means 4 is provided with six reflector-type photoelectric switches 15, 15, . . . for sensing the edge parts of first and second unvulcanized rubber sheets 2, 3. A control means 17 is provided for receiving signals from the photoelectric switches 15 and signals from a timer means 16 which measures a set period of time thereby controlling a driving means 6a for the feeding conveyer 6 and a driving means 7a for the take-up conveyer 7.

Figure 5:
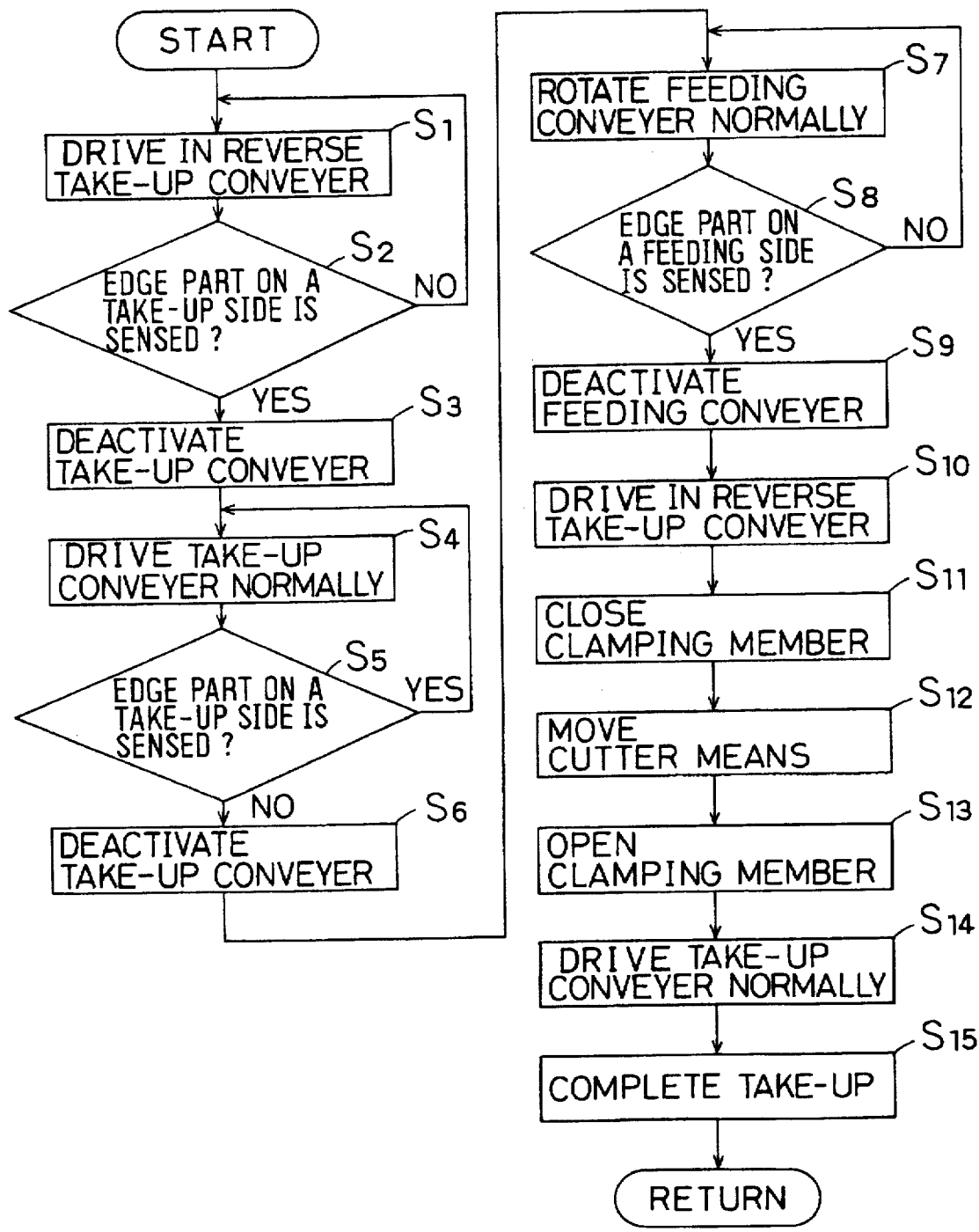
FIG. 5 is a flow chart showing a control flow of control means.

Description is made next about a control flow of the control means 17 when the first and second unvulcanized rubber sheets 2, 3 are joined together, with reference to FIG. 5.

On a take-up side, the first unvulcanized rubber sheet 2 is previously taken up. When the routine starts, the take-up conveyer 7 is driven in a reverse direction (Step S1), so that the edge part of the second unvulcanized rubber sheet 3 is dangled from the end of the take-up conveyer 7. When the length of dangled portion of the second unvulcanized rubber sheet 3 reaches a set length, that is, when the second rubber sheet 3 is dangled to a set position, the rubber sheet 3 obstructs optical paths of the photoelectric switches 15 so that the photoelectric switches 15 turn ON. Then, at a step S2, depending on whether the photoelectric switches 15 turn ON, there is judged whether the edge part of the second rubber sheet 3 located on the take-up side is dangled to the set position at which both the edge parts of the rubber sheets 2, 3 can be joined. When the photoelectric switches 15 do not turn ON, the edge of the second rubber sheet 3 does not reach the set position, so that the reverse rotational driving of the take-up conveyer 7 is continued. When the photoelectric switches 15 turn ON, the driving means 7a for driving the take-up conveyer 7 is deactivated at a step S3. In this time, the first unvulcanized rubber sheet 2 is still on the feeding conveyer 6 and is not dangled from the end of the feeding conveyer 6.

After deactivated, the take-up conveyer 7 is controlled to rotate in a normal direction for, for example, one second by time control of the timer means 16 at a step S4, so that the second rubber sheet 3 is taken up by tens of millimeters. The reason for this is that the edge of the second unvulcanized rubber sheet 3 is moved to an upper position by tens of millimeters than the set position at which both the edge parts of the rubber sheets 2, 3 can be joined and thus the optical paths of the photoelectric switches 15 are not obstructed.

Then, there is judged at a step S5 whether the photoelectric switches 15 turn ON. When the judgment is YES, this means an amount of the second rubber sheet 3 to be taken up is insufficient. Accordingly, the take-up conveyer 7 is further driven in a normal direction to continue to take up the second rubber sheet 3. When the judgment at the step S5 is NO, this means the edge part of the second rubber sheet 3 does not obstruct the optical paths of the photoelectric switches 15. In this case, the take-up conveyer 7 is deactivated at a step S6, thereby suspending the take-up of the second rubber sheet 3.

After the take-up conveyer 7 is deactivated, the feeding conveyer 6 is driven in a normal direction at a step S7, so that the first unvulcanized rubber sheet 2 on the feeding conveyer 6 is fed to dangle its edge part from the end of the feeding conveyer 6. Then, as in the case at the step S2, depending on whether the photoelectric switches 15 turn ON, there is judged at a step S8 whether the edge part of the first rubber sheet 2 on a feeding side is dangled to the set position at which both the edge parts of the rubber sheets 2, 3 can be joined. When the photoelectric switches 15 do not turn ON, the edge part of the first rubber sheet 2 does not reach the set position. In this case, the feeding conveyer 6 is further driven in a normal direction to continue to feed the first rubber sheet 2. When the photoelectric switches 15 turn ON, this means the edge part of the first rubber sheet 2 reaches the set position. In this case, the feeding conveyer 6 is deactivated at a step S9. Thereby, the edge part of the first rubber sheet 2 is set at the set position at which both the edge parts of the rubber sheet 2, 3 can be joined.

Next, the take-up conveyer 7 is driven in a reverse direction by time control of the timer means 16 at a step S10, so that the edge part of the second rubber sheet 3 is transferred by the amount taken up at the step S4 to reach the set position. Thus, both the edge parts of the first and second rubber sheets 2, 3 are set at the set position at which they can be joined.

After both the edge parts of the rubber sheets 2, 3 are set at the set position, the clamping member 13 is activated by the air cylinder 14 at a step S11, so that the edge parts of the first and second rubber sheets 2, 3 are clamped between the clamping member 13 and the disk receiving plate 12. Then, at a step S12 the cutting and joining means 5 is moved at a fixed speed in a rubber sheet width direction by the driving device 10 at a step S12 to cut the edge parts of both the rubber sheets 2, 3 while joining them.

In detail, "to cut the edge parts of both the rubber sheets 2, 3 by the cutting and joining means 5" means that by the movement of the cutting and joining means 5, the first pressing disk 5A joins with pressure the edge parts of both the rubber sheets 2, 3 and then the cutting disk 5C cuts the joined parts of the rubber sheets 2, 3. The width of the joined parts is determined by the width in a perpendicular direction of the peripheral pressing face 5a of the pressing disk 5A. The end position (cutting position) of the cutting disk 5C is not necessarily a center of the joined parts formed by the pressing disk 5A. In this embodiment, the cutting disk 5C cuts the portion located at a slightly lower position than the center of the joined parts.

After the joined parts are cut, the second pressing disk 5B is moved on the stacked rubber sheets 2, 3 along the cutting line as in the cutting disk 5C. This means joining with pressure with respect to both the edge parts of the rubber sheets 2, 3 is repeated. Thereby, joining strength at the joined parts is enhanced, spring back of cut portion by the cutting disk 5C is prevented and new edge parts of the rubber sheets 2, 3 which are formed by the cutting disk 5C are separated from the cut piece clamped by the clamping means 4.

When the above cutting by the cutting and joining means 5 is finished, the clamping member 13 is moved away from the base table 11 by rod extension of the air cylinder 14 of the clamping means 4 at a step S13, so that the clamping member 13 unclamps. Thereby, the cut piece of the rubber sheets 2, 3 is unclamped and falls.

Next, the take-up conveyer 7 is driven in a normal direction to start the take-up of the joined first and second rubber sheets 2, 3 at a step S14. The joined first and second rubber sheets 2, 3 are transferred on the take-up conveyer 7, taken up in order and the edge of the joined rubber sheets 2, 3 is placed on the take-up conveyer 7, thereby completing the take-up of the joined rubber sheets 2, 3 (step S15).

As shown in FIG. 6, if the dimensions M, L of the joined parts of the first and second rubber sheets 2, 3 are changed by the cutting and joining means 5, joining strength and tear strength of the joined part can be adjusted. More specifically, the dimension M can be adjusted by changing edge forms and pressing forces of the pressing disks 5A, 5B and the dimension L can be adjusted by changing the cut position by the cutting disk 5C. This is proved by the following test.

First, an S—S curve (stress-strain curve) of an unvulcanized rubber sheet with no joined part is obtained and based on the obtained data, target values for reference are set.

TABLE 1

| Elongation (%) | Rubber sheet modulus | | |
|---|---|---|---|
| | A (kg/cm$^2$) | B (kg/cm$^2$) | C (kg/cm$^2$) |
| 1 | 2.1 | 2.2 | 2.0 |
| 2 | 3.0 | 3.3 | 3.0 |
| 3 | 4.7 | 4.9 | 4.5 |
| 5 | 6.7 | 7.0 | 6.4 |
| 10 | 9.0 | 9.8 | 8.7 |

The above Table 1 shows tensile stresses, i.e., modulus (kg/cm$^2$) of rubber sheets A, B, C with respect to various elongations (%), which are obtained by using three kinds of dumbbell specimens of No. 1 type based on the JIS formed from unvulcanized rubber sheets A, B, C each having the thickness of 0.7 mm and using respective S—S curves obtained from the respective dumbbell specimens. Since tensile stress of an unvulcanized rubber sheet readily varies depending on the specimen temperature, each of the unvulcanized rubber sheets is calendered, the above dumbbell specimens are formed from the calendered rubber sheets, the specimens are cured at the temperature of 20° C. for 24 hours, and then the tensile stresses of the cured specimens are measured at the temperature of 20°. C. In a like manner, tear strength and joining strength are also measured.

In effect, a rubber sheet is gradually elongated so as to be tensed in a length direction thereof as it undergoes processes such as rolling, cutting at a right angle, joining and forming. However, the actual elongation of the rubber sheet does not excess 3%. Accordingly, the target value for reference is set to the modulus at the 3% elongation.

Next, tear strength at the 3% elongation is obtained as a value (kg/cm) of resistance against tear when the rubber sheet begins to be torn.

TABLE 2

| | Rubber sheet | | |
|---|---|---|---|
| | A | B | C |
| Tear resistance value | 7.17 kg/cm | 6.65 kg/cm | 7.21 kg/cm |

Based on the above data, the target values for reference are set as follows:

(i) the tensile stress at joined parts is 4.0 kg/cm$^2$ or more at the 3% elongation;

(ii) the tear strength at joined parts is 6.0 kg/cm$^2$ or more at the 3% elongation; and as another target value, (iii) the thickness h of joined parts is h≦1.33 W (W is an original thickness).

Preferably, the tensile stress and the tear strength at the joined part are equal to those of the other portion of the rubber sheet, the elongation of the joined part is equal to that of the other portion and the thickness h of the joined part is close to the original thickness W.

In order to estimate the above points, the joined part and the other portion of the unvulcanized rubber sheet are each punched to obtain dumbbell specimens of No. 1 type based on the JIS or B-type specimens for tensile test, and with the use of the obtained specimens and a normal rubber tensile test machine, comparison is made between the specimen of the joined part and the specimen of the other portion with reference to a relation at a fixed tension speed between tensile stress and elongation, that is, an S—S curve, or with reference to tensile strength. Further, the thickness of the joined part can be readily measured with the use of a dial thickness gauge.

In detail, as shown in FIG. 7, there is used a disk 31 which has a thickness U of 2.0 mm and both edge side faces 31a of which each have an angle of tilt θ of 35°. Various kinds of disks are produced by cutting the edge of the above disk 31 by set lengths V.

Figure 8:
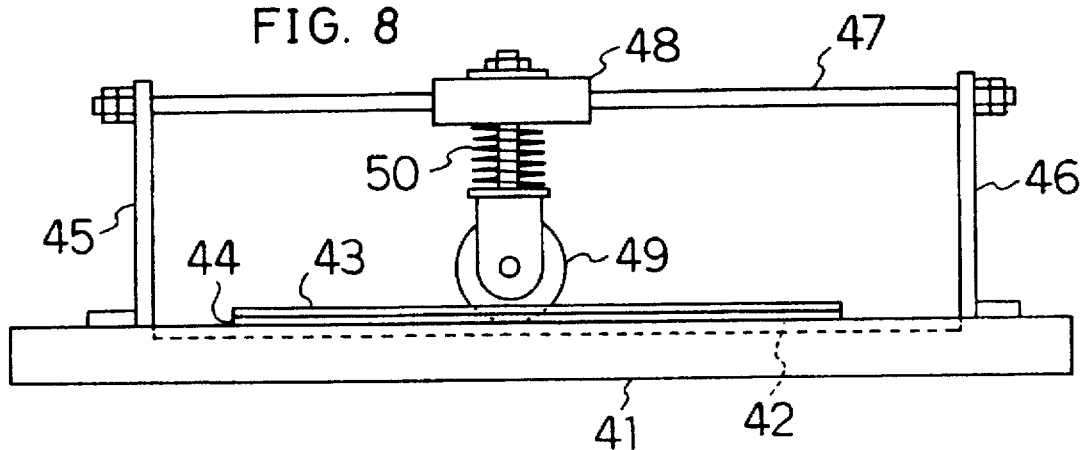
FIG. 8 is an explanatory diagram of a test machine.

In the tests on the joined part, as shown in FIG. 8, a disk receiving plate 42 (bearing steel) is placed on a base table 41 and two stacked rubber sheets 43, 44 with a thickness of 0.7 mm are set on the disk receiving plate 42. A rail member 47 is disposed between supporting poles 45, 46 so as to be located above the rubber sheets 43, 44. A slider 48 is supported to the rail member 47 so as to be slidable on the rail member 47. A cutting disk 49 is attached to the slider 48 and is forced downward at all times with a set pressing force by a spring 50. In this case, the cut widths V of the edge of the cutting disk 49 are 1 mm, 0.7 mm, 0.5 mm and 0 mm.

Test results are shown in Table 3. As is evident from the Table 3, when the cut width V of the edge of the cutting disk 49 is 0.5 mm, both of joining strength and tear strength at the 3% elongation are satisfactorily obtained and the rubber sheets 43, 44 can be cut. Here, the judgment (cut result) whether the rubber sheets 43, 44 were cut is made in the case of only one-way movement of the cutting disk 49.

TABLE 3

| Cut width V of disk | Pressing force (kg) | Cut result | Joining strength (kg/cm$^2$) | Tear strength (kg/cm) | Thickness h |
|---|---|---|---|---|---|
| 1 mm | 40 | NO | 6.0 | 8.2 | 1.33 W |
| | 45 | NO | 6.0 | 8.2 | 1.30 W |
| | 50 | NO | 6.1 | 8.2 | 1.31 W |
| | 60 | NO | 5.9 | 8.0 | 1.29 W |
| 0.7 mm | 40 | partially | 5.8 | 8.0 | 1.28 W |
| | 45 | partially | 5.5 | 7.9 | 1.25 W |
| | 50 | YES | 5.3 | 7.8 | 1.22 W |
| | 55 | YES | 5.2 | 7.6 | 1.20 W |
| 0.5 mm | 40 | YES | 5.0 | 7.3 | 1.15 W |
| | 45 | YES | 5.0 | 7.1 | 1.13 W |
| | 50 | YES | 4.8 | 7.2 | 1.13 W |
| | 55 | YES | 4.8 | 7.0 | 1.20 W |
| 0 mm | 30 | YES | 1.3 | 1.5 | 1.05 W |
| | 35 | YES | 1.3 | 1.4 | 1.05 W |
| | 40 | YES | 1.2 | 1.4 | 1.05 W |
| | 45 | YES | 1.2 | 1.3 | 1.05 W |

Figure 9:
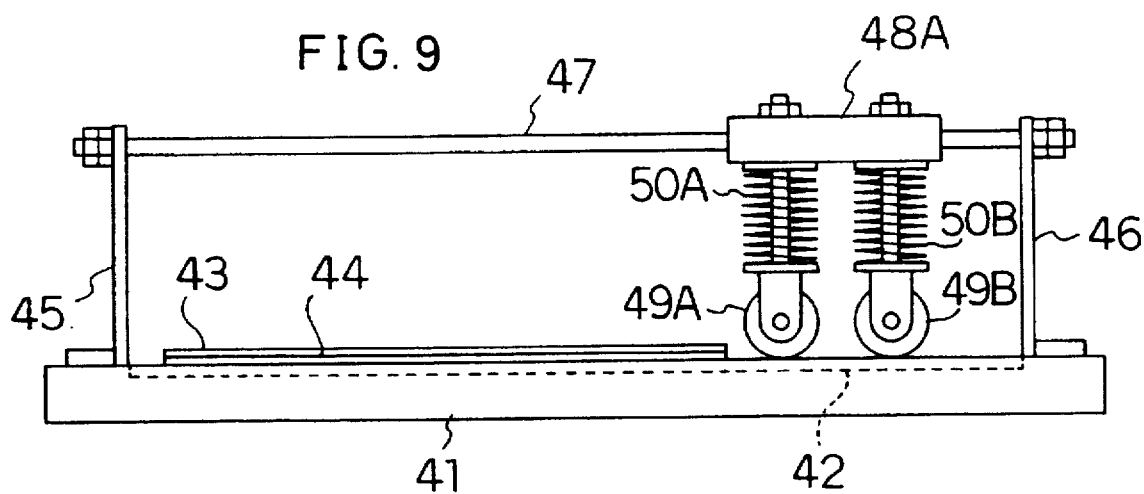
FIG. 9 is an explanatory diagram of another test machine.
Figure 10:
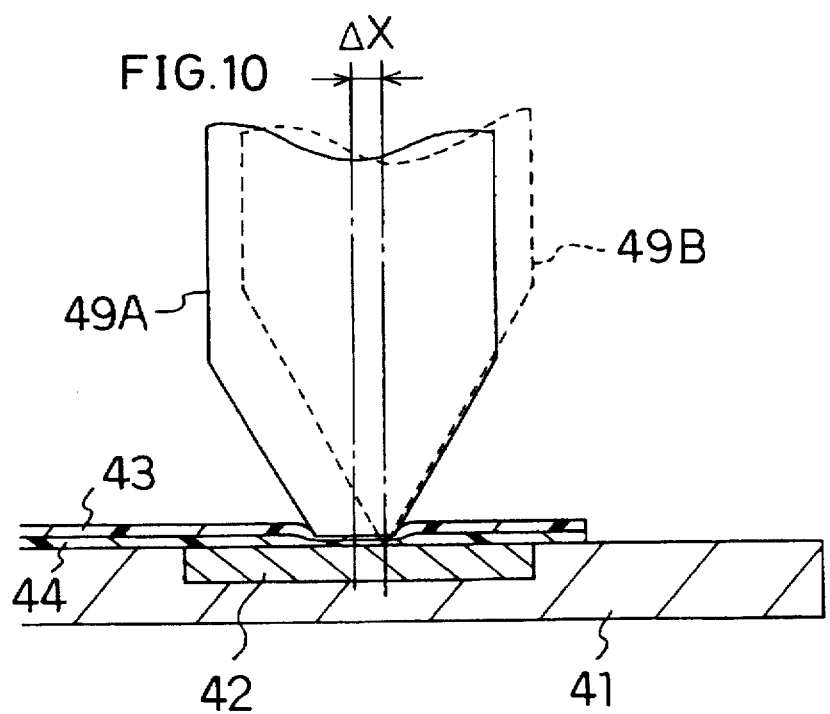
FIG. 10 is an explanatory diagram showing a relation between the pressing disk and the cutting disk.

Further, as shown in FIG. 9, a pressing disk 49A and a cutting disk 49B are attached to a slider 48A so as to be forced by springs 50A, 50B respectively and the same test as describe above is carried out. In this case, the cut widths V of the edge of the disk 31 are 1 mm and 0.7 mm. As shown in FIG. 10, the center line of the pressing disk 49A is fixed and the amount ΔX of displacement of the center line of the cutting disk 49B with respect to the fixed center line of the pressing disk 49A is varied. The pressing force of the cutting disk 49B is set to 35 kg.

The test results are shown in Table 4. As is evident from the Table 4, if the cut width V of the edge of the pressing disk 49A is 0.7 mm to 1.0 mm, the rubber sheets cannot be cut while good joining efficiency is obtained. In such a case, the rubber sheets can be joined and cut by using the pressing disk 49A together with the cutting disk 49B, thereby obtaining the same effects as in the above case. The joining strength and the tear strength are those in the case of the 3% elongation.

TABLE 4

| Cut width V of disk | Pressing force (kg) | ΔX (mm) | M (mm) | L (mm) | Joining strength (kg/cm²) | Tear strength (kg/cm) |
| --- | --- | --- | --- | --- | --- | --- |
| 1 mm | 45 | 0.7 | 1.23 | 1.31 | 6.1 | 8.0 |
|  | 45 | 0.5 | 1.22 | 1.10 | 5.6 | 7.9 |
|  | 45 | 0.3 | 1.24 | 0.84 | 5.1 | 6.8 |
|  | 55 | 0.7 | 1.20 | 1.28 | 6.1 | 8.1 |
|  | 55 | 0.5 | 1.17 | 1.07 | 5.8 | 7.5 |
|  | 55 | 0.3 | 1.14 | 0.82 | 5.4 | 7.0 |
| 0.7 mm | 35 | 0.5 | 1.18 | 1.05 | 5.8 | 7.8 |
|  | 35 | 0.3 | 1.15 | 0.81 | 5.5 | 6.6 |
|  | 35 | 0.1 | 1.09 | 0.63 | 5.0 | 6.4 |
|  | 40 | 0.5 | 0.93 | 1.03 | 5.9 | 7.5 |
|  | 40 | 0.3 | 0.90 | 0.80 | 5.7 | 7.1 |
|  | 40 | 0.1 | 0.90 | 0.62 | 5.3 | 6.8 |

We claim:

1. A rubber sheet joining method for joining edge parts of first and second unvulcanized rubber sheets so as to cut the rubber sheets stacked and join cut edge parts thereof, said method comprising:

a first step of aligning edges of the first and second unvulcanized rubber sheets with each other in a position where the rubber sheets are stackable and then clamping the edge parts of the rubber sheets thereby stacking them;

a second step of pressing the clamped edge parts of the rubber sheets along a line by a rotatably supported pressing disk having a peripheral pressing face thereby forming joined parts in said edge parts of a given width; and a third step of cutting an intermediate part of said joined parts of the rubber sheets along the line pressed by said disk in a width direction by a rotatably supported cutting disk having a sharp edge.

2. A rubber sheet joining method according to claim 1, wherein the pressing disk has a shape like the cutting disk whose edge has been radially truncated by about 0.7 mm and 1.0 mm to form said peripheral pressing face.

3. A rubber sheet joining method according to claim 2, wherein the cutting disk has edge side faces that are inclined at an angle of 35° with respect to the radius of said disk.

4. A rubber sheet joining method according to claim 3, wherein the thickness of the unvulcanized rubber sheet is 0.6 mm to 0.7 mm.

5. A rubber sheet joining method according to claim 1, further comprising a fourth step of, after the third step, pressing again the clamped edge parts of the rubber sheets along said line by a second pressing disk having a peripheral pressing face which is rotatably supported.

6. A rubber sheet joining method according to claim 5, wherein the second pressing disk has a shape like the cutting disk whose edge is radially truncated by about 0.7 mm to 1.0 mm to form said peripheral pressing face.

7. A rubber sheet joining method according to claim 6, wherein the cutting disk includes edge side faces that are inclined at an angle of 35° with respect to a radius of said disk.

8. A rubber sheet joining method according to claim 7, wherein the thickness of the unvulcanized rubber sheet is 0.6 mm to 0.7 mm.

9. A rubber sheet joining device for joining edge parts of first and second unvulcanized rubber sheets so as to cut the rubber sheets stacked and join cut edge parts thereof, comprising:

aligning means for aligning edges of the first and second unvulcanized rubber sheets with each other in a position where the rubber sheets are stackable;

clamping means for clamping the sheet edge parts aligned by the aligning means thereby stacking them; and cutting and joining means comprising a pressing disk having a peripheral face that is rotatably supported for forming joined parts in said edge parts of a given width and a cutting disk having a sharp edge that is rotatably supported for pressing and cutting an intermediate part of said joined parts of the sheet edge parts clamped by the clamping means along a same line in a width direction.

10. A rubber sheet joining device according to claim 9, wherein the cutting and joining means is so arranged that the rotatably supported cutting disk having the sharp edge is interposed between first and second rotatably supported circular pressing disks, each of which has a peripheral pressing face for pressing said sheet edge parts along the same line.

11. A rubber sheet joining device according to claim 10, wherein each of the first and second pressing disks has the same shape as the cutting disk whose edge has been radially truncated by about 0.7 mm to 1.0 mm.

12. A rubber sheet joining device according to claim 11, wherein the cutting disk includes edge side faces that are inclined at an angle of 35° with respect to a radius of said disk.

13. A rubber sheet joining device according to claim 9, wherein the aligning means comprises:

first and second transfer means for transferring the first and second unvulcanized rubber sheets at a set speed;

timer means for measuring a set period of time;

a photoelectric switch for sensing the edge parts of the first and second unvulcanized rubber sheets; and control means connected to the timer means and the photoelectric switch for controlling the first and second transfer means according to signals from the timer means and the photoelectric switch in order that the edge parts of the first and second unvulcanized rubber sheets are aligned with each other.

14. A rubber sheet joining method according to claim 9, wherein the clamping means comprises:

a base table fixed at a set position;

a clamping member opposed to the base table; and clamping member driving means connected to the clamping member for adjusting a distance between the clamping member and the base table.

15. A rubber sheet joining method for joining edge parts of first and second unvulcanized rubber sheets so as to cut the rubber sheets stacked and join cut edge parts thereof, said method comprising:

a first step of aligning edges of the first and second unvulcanized rubber sheets with each other in a position where the rubber sheets are stackable and then clamping the edge parts of the rubber sheets thereby stacking them; and a second step of joining the edge parts clamped at the first step by pressing said edge parts along a line via a rotatably mounted pressing disk having a peripheral pressing face thereby formed joined parts in said edge parts of a given width and then cutting an intermediate part of said joined parts with pressure along said line in a width direction by a rotating cutting disk having a cutting edge of about 0.5 mm.

16. A rubber sheet joining method according to claim 15, wherein the cutting disk includes edge side faces that are inclined at an angle of 35° with respect to a radius of said disk.

17. A rubber sheet joining method according to claim 16, wherein the thickness of the unvulcanized rubber sheet is 0.6 mm to 0.7 mm.

18. A rubber sheet joining device for joining edge parts of first and second unvulcanized rubber sheets so as to cut the rubber sheets stacked and join cut edge parts thereof, comprising:

aligning means for aligning edges of the first and second unvulcanized rubber sheets with each other in a position where the rubber sheets are stackable;

clamping means for clamping the sheet edge parts aligned by the aligning means thereby stacking them; and cutting and joining means having a rotatably supported pressing disk for pressing said edge parts along a line and for forming joined parts in said edge parts of a given width and a cutting disk having a peripheral cutting edge for making a cut about 0.5 mm in width for joining the sheet edge parts while cutting in an intermediate part of said joined parts along said line in a width direction.

19. A rubber sheet joining device according to claim 18, wherein the cutting disk includes edge side faces inclined at an angle of 35° with respect to a radius of the disk.

* * * * *